(12) United States Patent  
Peterson

(10) Patent No.: US 8,727,458 B2
(45) Date of Patent: May 20, 2014

(54) HIGH DENSITY TELECOMMUNICATIONS MOUNTING DRAWER

(75) Inventor: Karl J. Peterson, Saint Paul, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 1922 days.

(21) Appl. No.: 11/584,333

(22) Filed: Oct. 20, 2006

(65) Prior Publication Data
US 2008/0093958 A1 Apr. 24, 2008

(51) Int. Cl.
*A47B 88/00* (2006.01)
*A47B 95/00* (2006.01)

(52) U.S. Cl.
USPC ............. 312/303; 312/265.1; 312/223.1

(58) Field of Classification Search
USPC ........ 312/223.1, 298, 303, 302, 265.1–265.4, 312/223.6; 211/26; 361/610, 724, 727, 608; 174/101
See application file for complete search history.

(56) References Cited

U.S. PATENT DOCUMENTS

| | | | | |
|---|---|---|---|---|
| 2,773,940 | A * | 12/1956 | Lebedinsky | 370/200 |
| 4,480,880 | A * | 11/1984 | Cather | 384/26 |
| 5,460,441 | A * | 10/1995 | Hastings et al. | 312/298 |
| 5,784,251 | A * | 7/1998 | Miller et al. | 361/679.6 |
| 6,208,522 | B1 * | 3/2001 | Manweiler et al. | 361/752 |
| 6,327,139 | B1 * | 12/2001 | Champion et al. | 361/608 |
| 6,438,310 | B1 | 8/2002 | Lance et al. | |
| 6,504,988 | B1 | 1/2003 | Trebesch et al. | |
| 6,625,374 | B2 | 9/2003 | Holman et al. | |
| 6,677,520 | B1 | 1/2004 | Kim et al. | |
| 6,685,033 | B1 * | 2/2004 | Baddour et al. | 211/26 |
| 6,715,619 | B2 | 4/2004 | Kim et al. | |
| 6,748,155 | B2 | 6/2004 | Kim et al. | |
| 6,792,190 | B2 | 9/2004 | Xin et al. | |
| 6,968,111 | B2 | 11/2005 | Trebesch et al. | |
| 6,975,510 | B1 * | 12/2005 | Robbins et al. | 361/695 |
| 7,031,588 | B2 * | 4/2006 | Cowley et al. | 385/135 |
| 7,061,767 | B2 * | 6/2006 | Schmidtke et al. | 361/724 |
| 7,068,907 | B2 | 6/2006 | Schray | |
| 7,097,047 | B2 * | 8/2006 | Lee et al. | 211/26.2 |
| 7,120,348 | B2 | 10/2006 | Trebesch et al. | |
| 7,137,512 | B2 * | 11/2006 | Nguyen et al. | 211/26 |
| 7,171,099 | B2 | 1/2007 | Barnes et al. | |
| 7,302,154 | B2 | 11/2007 | Trebesch et al. | |
| 7,308,184 | B2 | 12/2007 | Barnes et al. | |
| 7,418,182 | B2 | 8/2008 | Krampotich | |
| 7,437,049 | B2 | 10/2008 | Krampotich | |
| 7,463,811 | B2 | 12/2008 | Trebesch et al. | |
| 7,499,623 | B2 | 3/2009 | Barnes et al. | |
| 2002/0118820 | A1 * | 8/2002 | Sinclair et al. | 379/399.01 |
| 2003/0222034 | A1 * | 12/2003 | Champion et al. | 211/26 |
| 2007/0211882 | A1 * | 9/2007 | Hatte et al. | 379/291 |
| 2007/0211883 | A1 | 9/2007 | Franzke et al. | |

* cited by examiner

*Primary Examiner* — Darnell Jayne
*Assistant Examiner* — Andres F Gallego
(74) *Attorney, Agent, or Firm* — Merchant & Gould P.C.

(57) ABSTRACT

A drawer for mounting telecommunications equipment to a rack is disclosed. The drawer includes a lower platform and an upper platform for supporting the telecommunications equipment. The upper platform is pivotably coupled to the lower platform. The drawer further includes a mounting structure for mounting the drawer to the rack, wherein the mounting structure includes telescoping portions that allow the drawer to be slid away from and toward the rack.

9 Claims, 20 Drawing Sheets

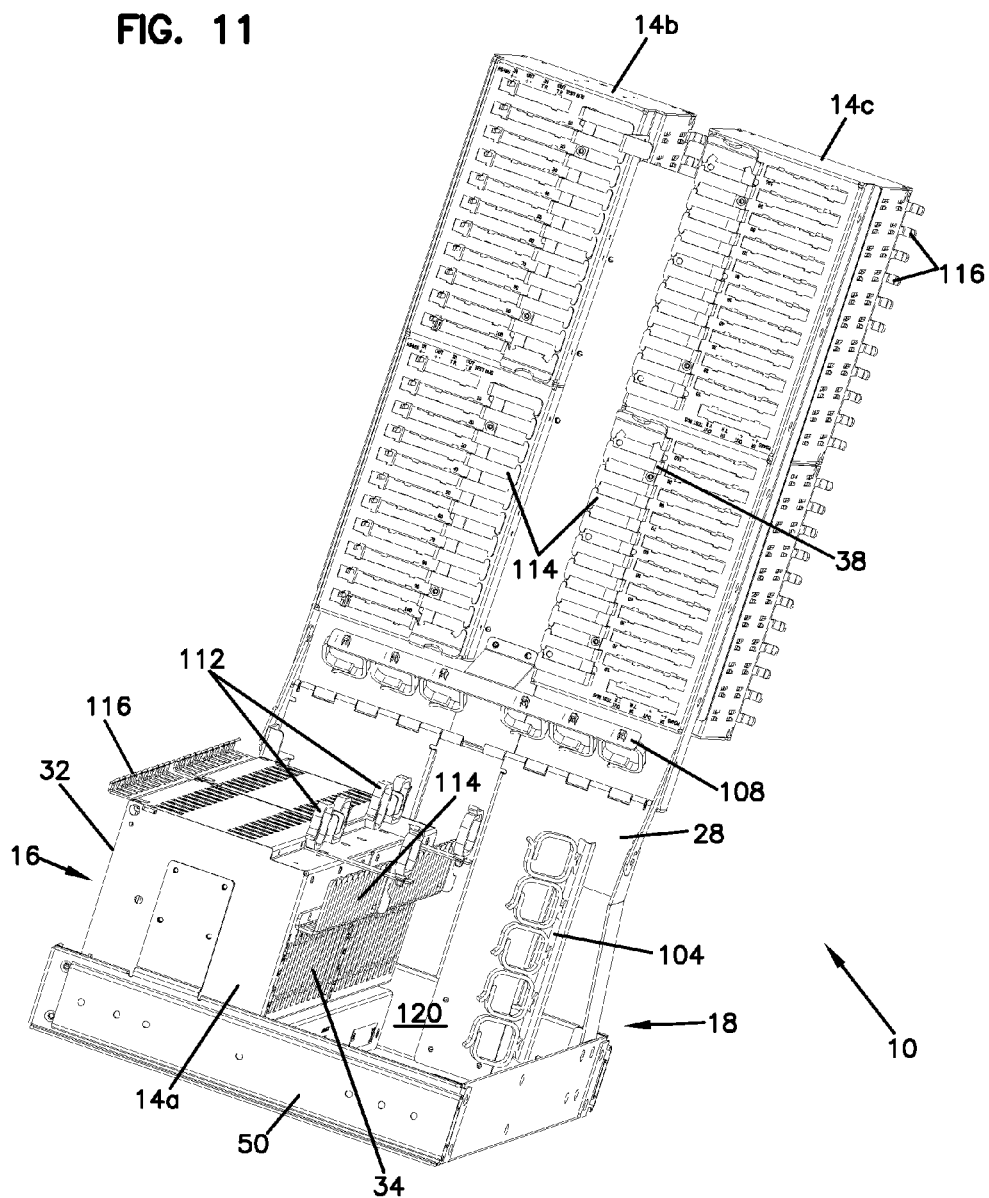

HIGH DENSITY TELECOMMUNICATIONS MOUNTING DRAWER

TECHNICAL FIELD

The principles disclosed herein relate generally to a telecommunications device. Specifically, the principles disclosed herein relate to arrangements for mounting telecommunications equipment to a rack.

BACKGROUND

In telecommunications, high density is desirable, especially if provided in combination with standard sized equipment or standard footprints. However, achieving high density and standardization in telecommunication connectivity leads to certain design challenges. Cable management and easy access are both issues that must be taken into consideration in the configuration of high density equipment. There is a need in the art for telecommunications equipment and for mounting techniques thereof that can achieve high connectivity density, utilize standard footprints, and provide effective cable management as well as easy accessibility to all major components of the equipment.

SUMMARY

The present disclosure relates to a high density mounting arrangement for mounting telecommunications equipment on a rack.

In one particular aspect, the disclosure relates to a drawer including a lower platform and an upper platform for supporting telecommunications equipment, wherein the upper platform is pivotably coupled to the lower platform and the drawer further including a mounting structure for mounting the drawer to a rack, the mounting structure including telescoping portions that allow the drawer to slide away from and toward the rack.

BRIEF DESCRIPTION OF THE DRAWINGS

Certain embodiments of present disclosure will now be described, by way of examples, with reference to the accompanying drawings, in which:

FIG. 11 illustrates a side perspective view of the drawer of FIG. 10;

DETAILED DESCRIPTION

Figure 1:
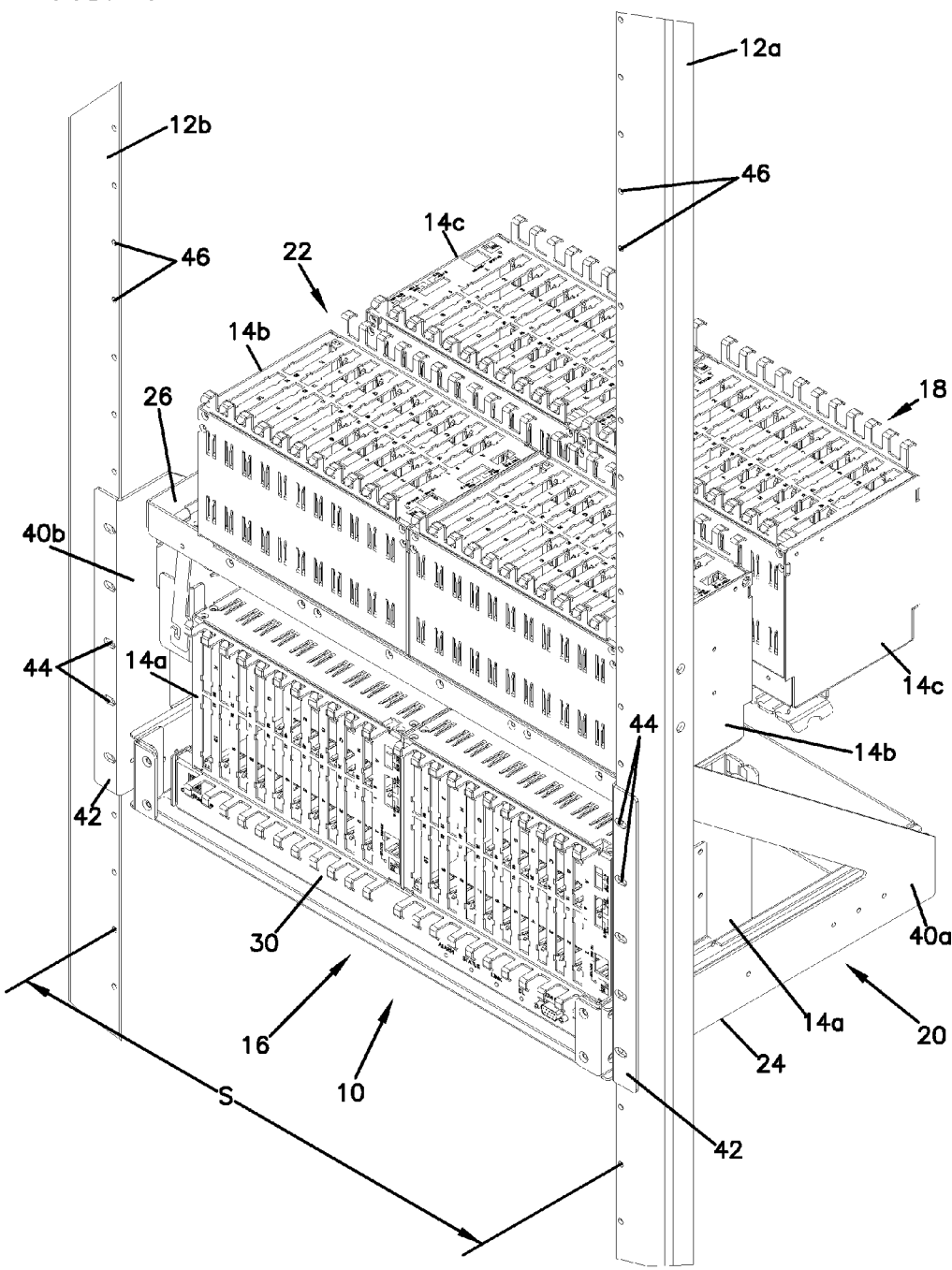
FIG. 1 is a front perspective view of a telecommunications drawer having features that are examples of inventive aspects in accordance with the principles of the present disclosure, the telecommunications drawer shown with a plurality of telecommunications distribution blocks mounted thereon, the telecommunications drawer shown mounted on rails of a rack via mounting brackets.

Referring to FIGS. 1-4, a telecommunications drawer 10 having features that are examples of inventive aspects in accordance with the principles of the present disclosure is illustrated. The drawer 10 is shown mounted on two uprights 12a, 12b (i.e., rails, channels, etc.), forming part of a telecommunications rack, cabinet, etc. In one embodiment, the hole to hole spacing S is about 515 mm.

The drawer 10 is shown to include a plurality of telecommunication distribution blocks 14 mounted thereon. It should be noted that the telecommunication distribution blocks 14 are simply one example of telecommunications equipment that might be mounted on the drawer 10 having features that are examples of inventive aspects in accordance with the principles of the present disclosure. The telecommunication distribution blocks 14, as will be explained further below, are an example telecommunications device that may include a high density of connection locations that is suitable for use with the drawer 10 illustrated and described herein. The telecommunication distribution blocks 14 will be referred to herein throughout the specification to describe the inventive features of the drawer 10, but, in no way are intended to limit the scope of the inventive aspects of the disclosure.

Still referring to FIGS. 1-4, the drawer 10 includes a front end 16, a rear end 18, a right side 20 and a left side 22. The drawer 10 includes a lower platform 24 and an upper platform 26 that is connected to the lower platform 24 with a vertical extension 28 (please see FIG. 14). As shown in one embodiment, a pair of telecommunication distribution blocks 14a are mounted on the lower platform 24 while two pairs of telecommunication distribution blocks, front pair 14b, back pair 14c, are mounted on the upper platform 26. A controller unit 30 is also mounted on the lower platform 24, directly under the telecommunication distribution blocks 14a.

The telecommunication distribution blocks 14 are configured to provide telephone connectivity between a distribution (e.g., customer, subscriber, etc.) side and a service side (i.e., central office). Each block 14 generally includes a rectangular, box-like configuration.

The blocks 14a located on the lower platform 24 are configured to support connectors at a front side 32 of the blocks 14a and to support connectors at a rear side 34 of the blocks 14a. In the embodiment shown, the blocks 14a located on the lower platform 24 support connectors in the form of insulation displacement terminals (i.e., punch-downs) for connection to electrical cables. The insulation displacement connectors can be connected to circuitry (e.g., circuit boards) positioned within the blocks 14. The cables connected to the front connectors can be customer cables, while the cables connected to the rear connectors can lead to a central office. As will be discussed in further detail below, the cable management features of the drawer 10 are configured to route all cables to the rear end 18 of the drawer 10.

The upper platform 26 includes the two pairs of telecommunication distribution blocks 14b, 14c mounted thereon. The blocks 14b, 14c on the upper platform 26 are configured similar to the blocks 14a on the lower platform 24. However, the blocks 14b, 14c on the upper platform 26 are oriented in a perpendicular direction to the blocks 14a on the lower platform 24. Thus, for the upper blocks 14b, 14c, the front and rear sides (32, 34 of blocks 14a) are oriented upwardly and downwardly and can be referred to as the top side 36 and the bottom side 38, respectively. The upper blocks 14b, 14c are, thus, configured to support card-edge connectors on the top 36 and the bottom sides 38 of the blocks 14b, 14c. The cables connected to the connectors on the top sides 36 of the blocks 14b, 14c on the upper platform 26 can lead to the customers, while the cables connected to the connectors on the bottom sides 38 of the blocks 14b, 14c, can lead to the central office. As will discussed later, cables are also routed between the upper 14b, 14c and the lower blocks 14a.

An example telecommunication distribution block and a controller are described in greater detail in commonly owned U.S. patent application Ser. No. 11/503,667, filed Aug. 14, 2006, entitled "CROSS-CONNECT DISTRIBUTION UNIT", the entire disclosure of which is hereby incorporated by reference.

Still referring to FIGS. 1-4, the drawer 10 is mounted to the uprights 12a, 12b via a pair of mounting brackets 40a, 40b. The mounting brackets 40, in the depicted embodiment, include generally a triangular shape. Other shapes are possible. The mounting brackets 40 are fastened to the right and the left sides 20, 22 of the drawer 10. The mounting brackets 40 also include forward facing upright flanges 42 with fastener holes 44 that mate with holes 46 on the uprights 12 for adjustable mounting of the drawer 10 on the uprights 12.

In one embodiment, the drawer 10 has a width W of approximately 515 mm, matching the hole to hole spacing S between the vertical rails 12a, b of the rack, and a height H of approximately 400 mm or less including the height of the mounted blocks 14. In one embodiment, the drawer 10 sized to fit within a standard rack unit of 19 inches. In another embodiment, the drawer 10 is sized to fit within a rack unit of 23 inches.

Figure 2:
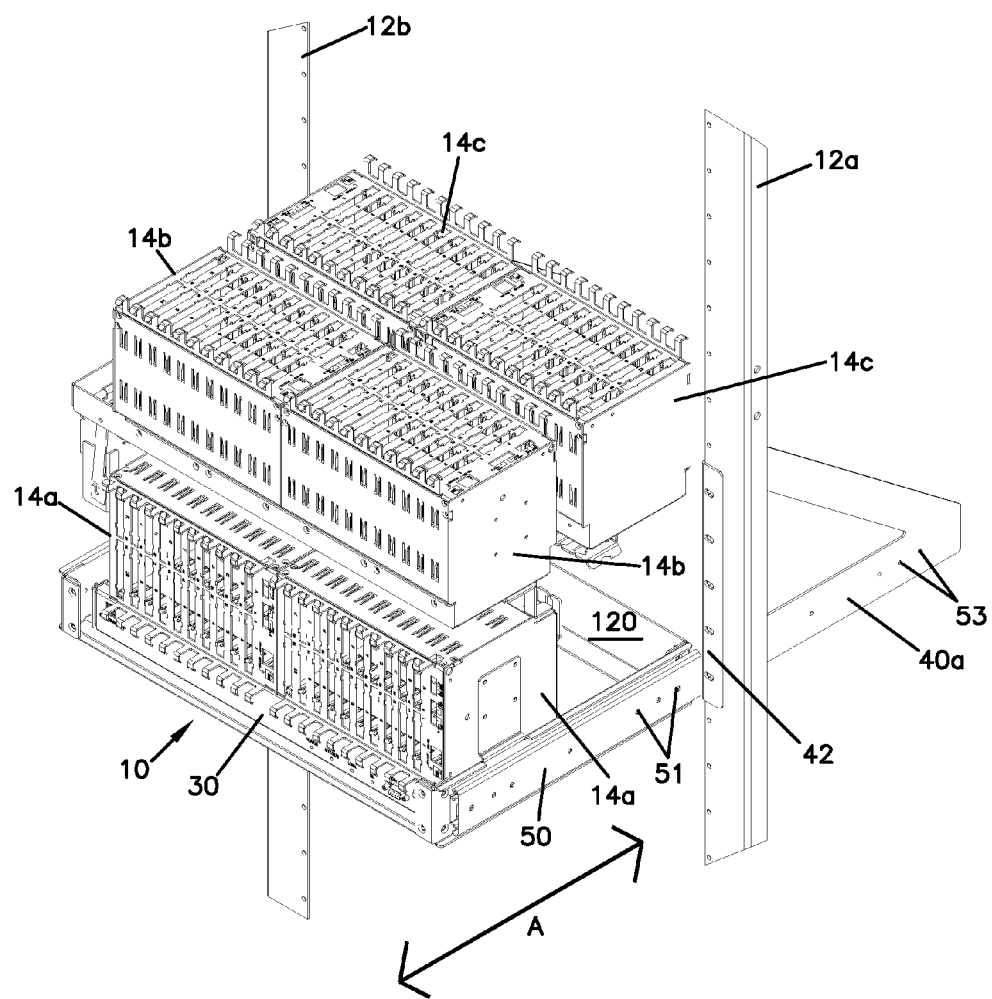
FIG. 2 illustrates the front to back slidability of the telecommunications drawer of FIG. 1, the slidable aspect of the drawer providing access to hard-to-reach portions of the telecommunication distribution blocks mounted thereon, the slide guides of the drawer shown in a non-extended position to illustrate the fastener holes on the outer slide guide for attachment to the fastener holes of the mounting brackets.
Figure 3:
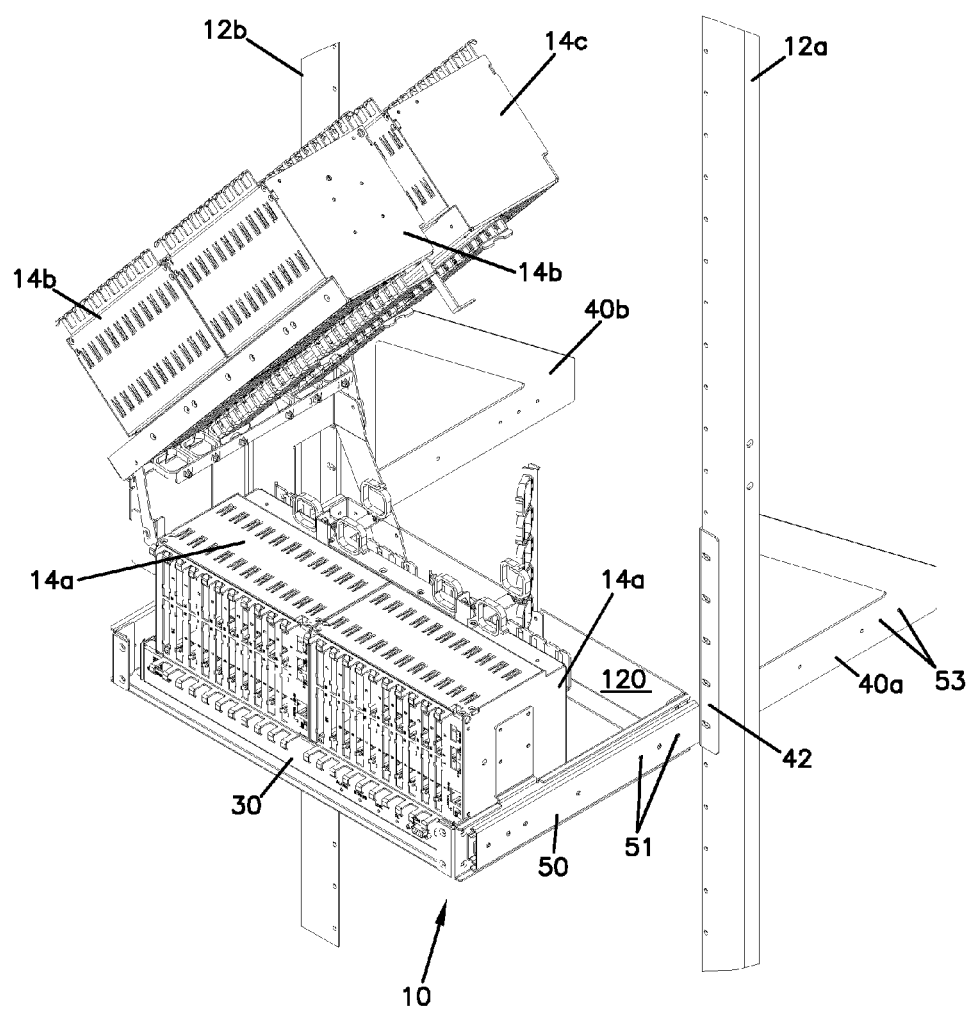
FIG. 3 illustrates the telecommunications drawer of FIG. 2, wherein the upper platform of the drawer has been partially pivoted with respect to the lower platform of the drawer.
Figure 4:
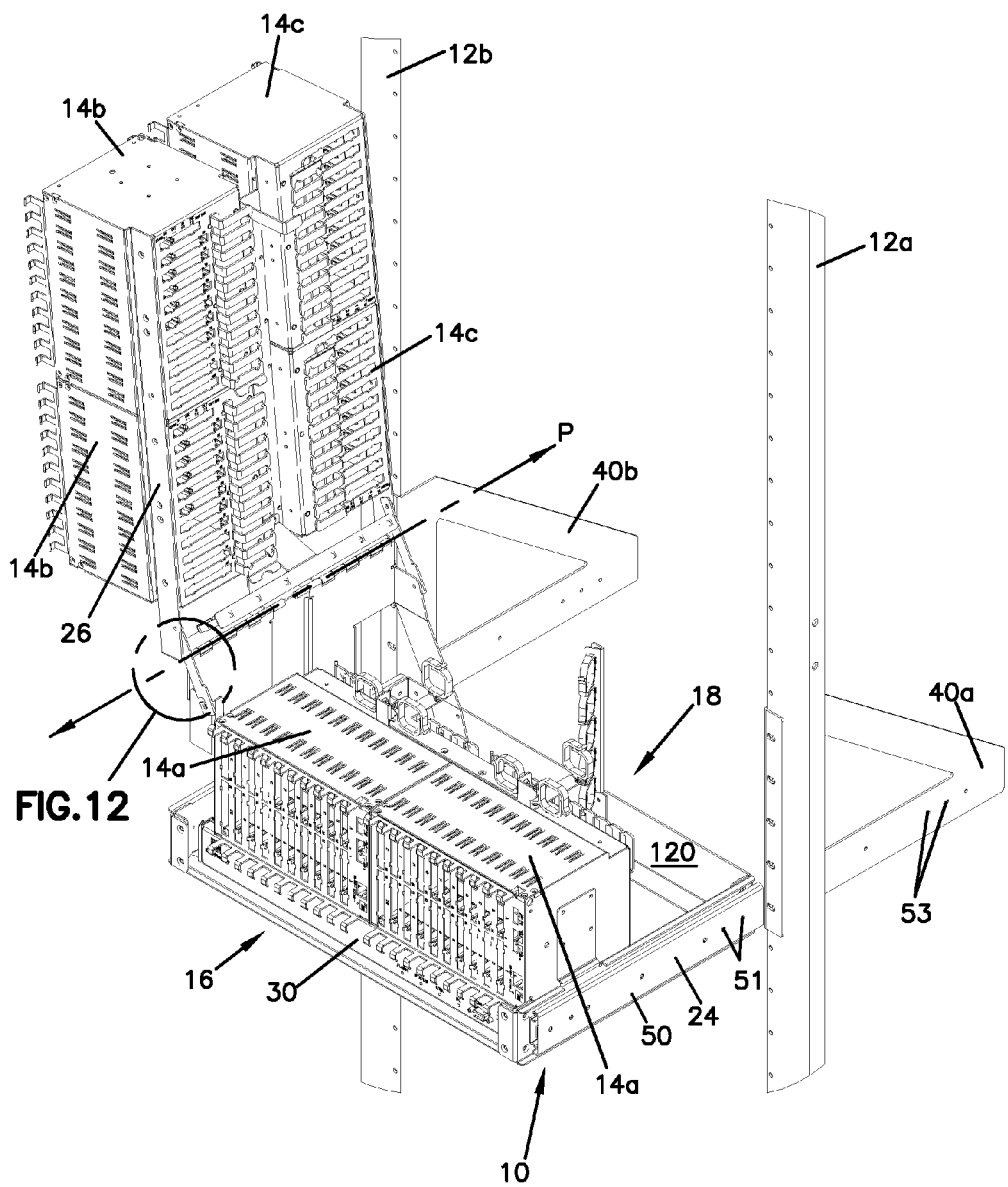
FIG. 4 illustrates the telecommunications drawer of FIG. 2, wherein the upper platform of the drawer has been fully pivoted up with respect to the lower platform of the drawer.
Figure 5:
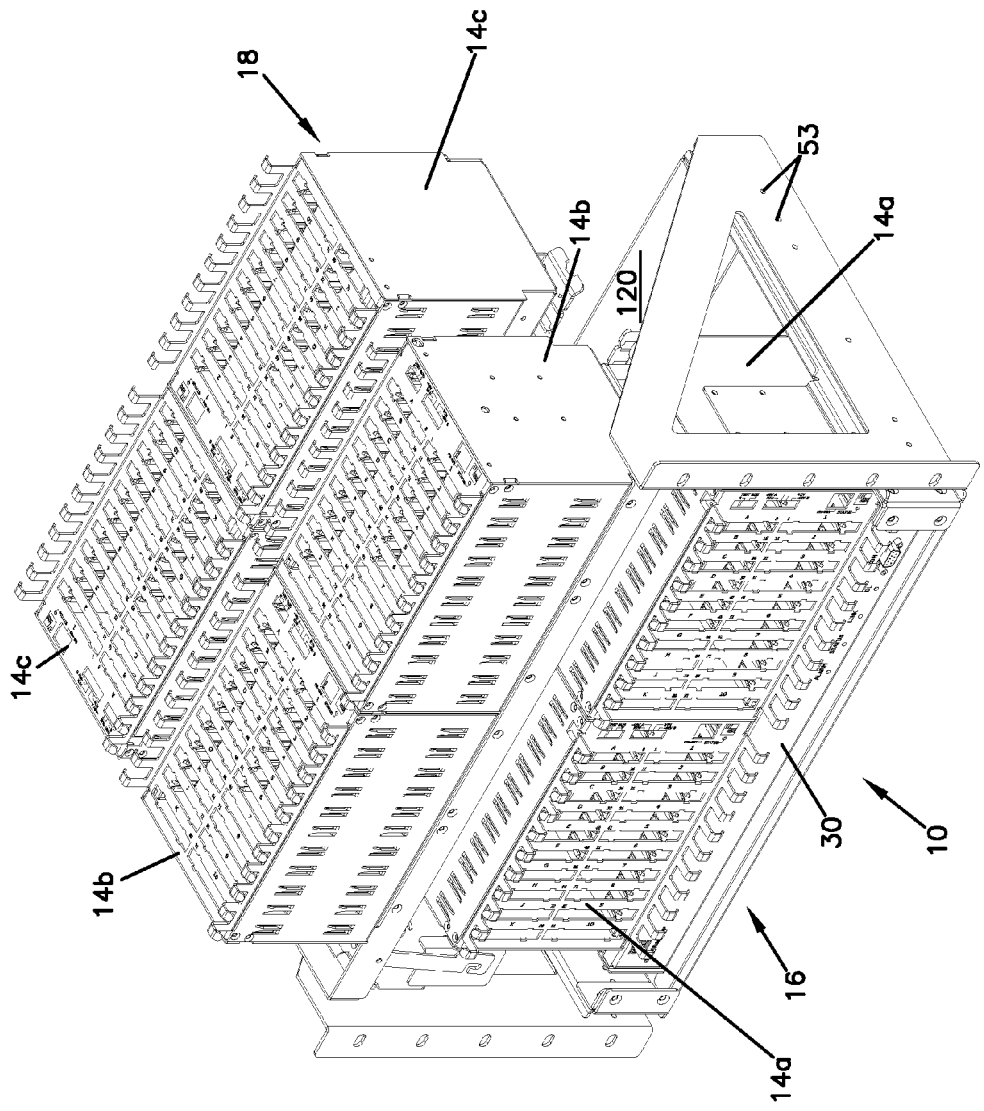
FIG. 5 is a front perspective view of the telecommunications drawer of FIG. 1 and the mounting brackets used for mounting drawer on a rack, the telecommunications drawer and the mounting brackets shown removed from the rack.
Figure 6:
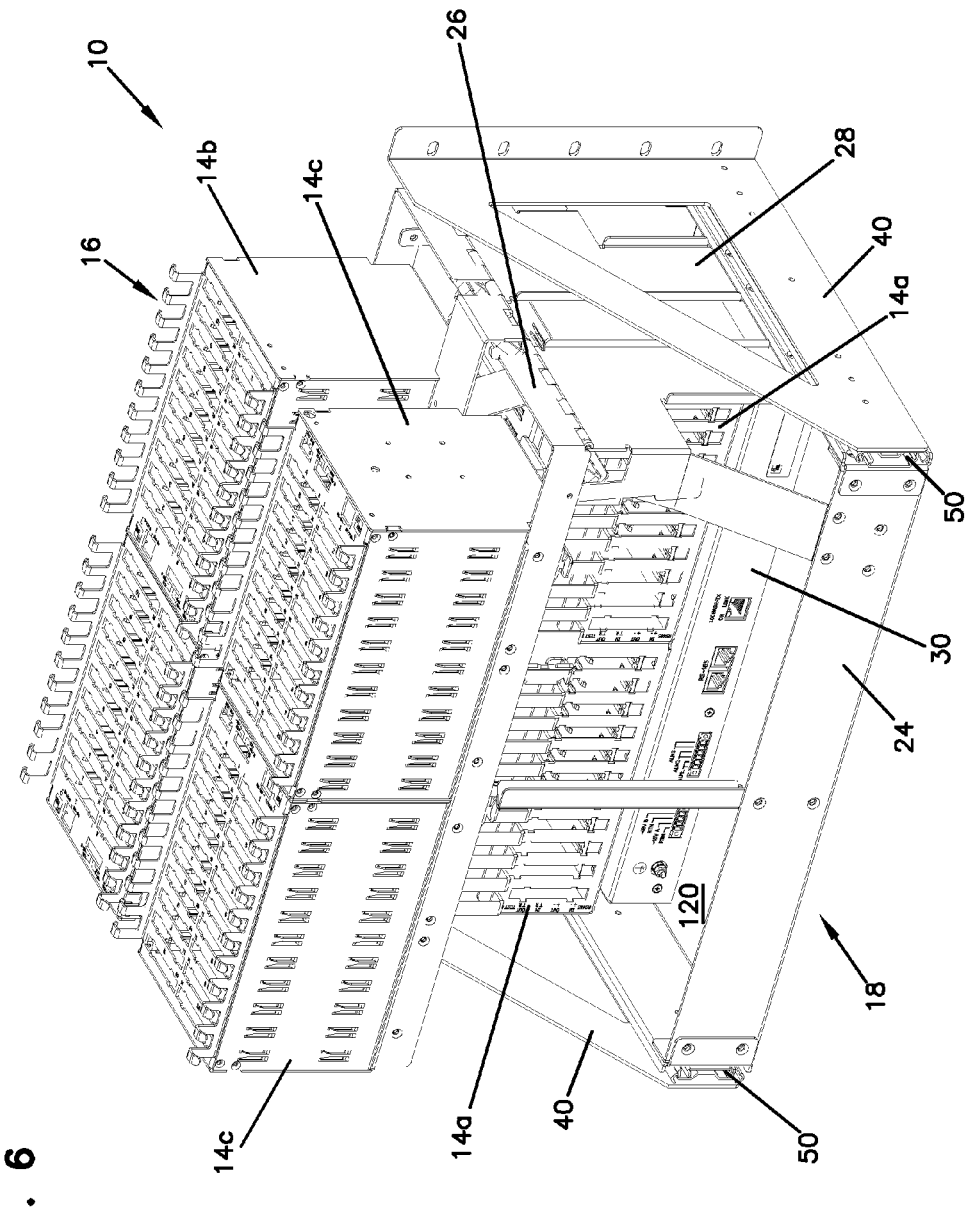
FIG. 6 is a rear perspective view of the telecommunications drawer of FIG. 5.
Figure 7:
FIG. 7 is a front elevational view of the telecommunications drawer of FIG. 5.
Figure 8:
FIG. 8 is a top plan view of the telecommunications drawer of FIG. 5.
Figure 9:
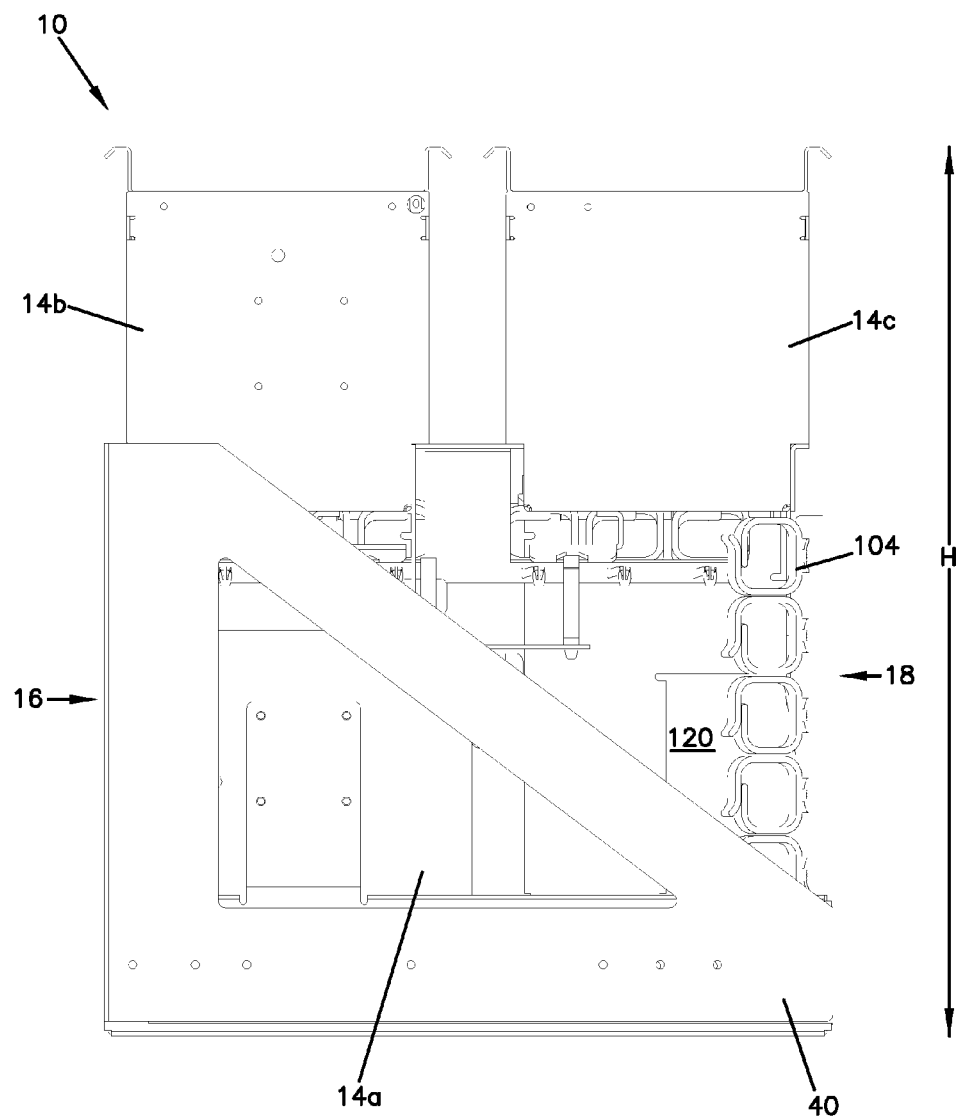
FIG. 9 is a right side elevational view of the telecommunications drawer of FIG. 5.
Figure 10:
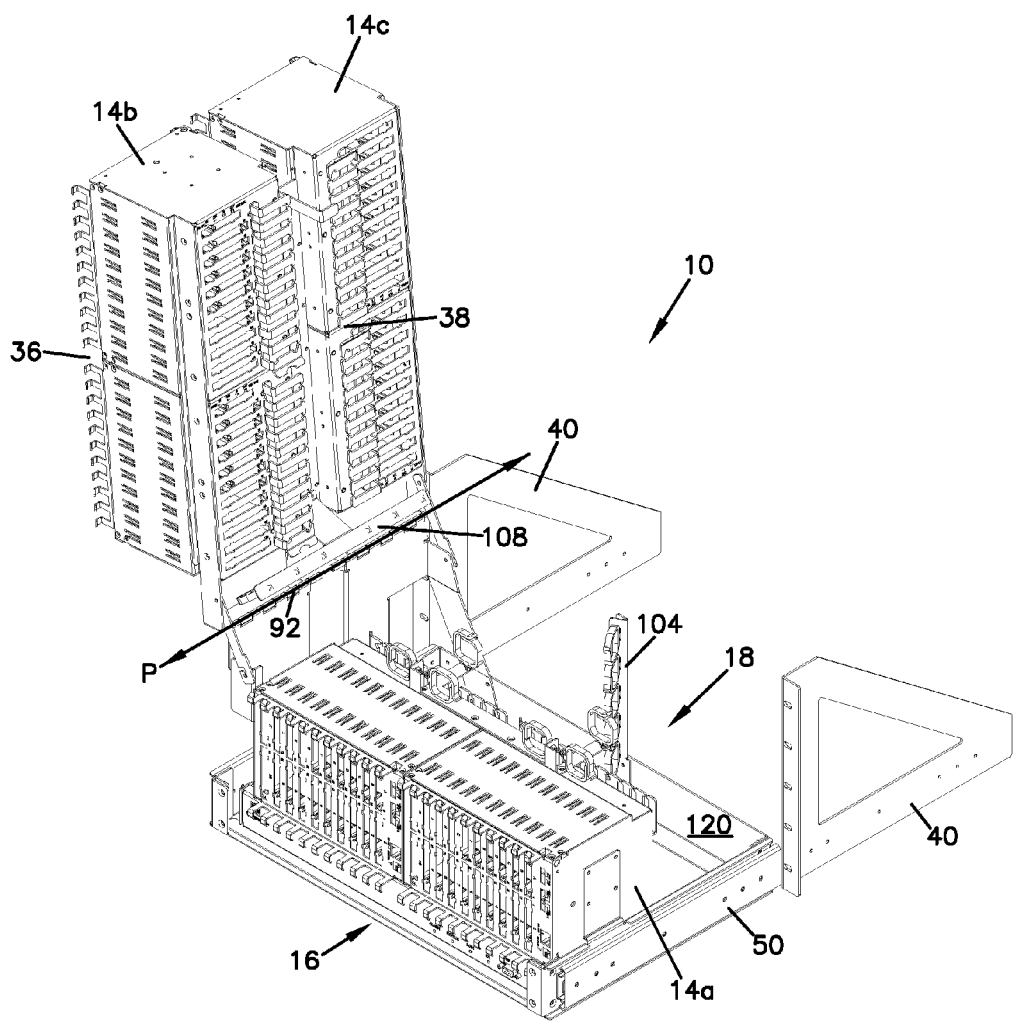
FIG. 10 illustrates the telecommunications drawer of FIG. 5, wherein the drawer has been slid forwardly from the mounting brackets and the upper platform has been fully pivoted with respect to the lower platform of the drawer.

The drawer 10 is configured to provide access to the cable connections at the rear end 18 of the drawer 10, as well as, access to cable connections at the bottom 38 of the upper blocks 14b, 14c. FIG. 2 illustrates a slidability feature of the telecommunications drawer 10. As indicated by the arrow A in FIG. 2, the drawer 10 is slidably mounted with respect to the uprights 12. The drawer 10 can be slidably pulled away (e.g., in a forward direction) from the uprights 12a, 12b to gain access to the rear portion 18 of the drawer 10. As illustrated in FIGS. 3-4, once the drawer 10 is slidably pulled out, the upper platform 26 of the drawer 10, thus, the upper blocks 14b, 14c, can be pivotally moved away from the lower platform 24 to gain further access to the rear portion 18 of the drawer 10 and access to the bottom sides 38 of the upper blocks 14b, 14c.

Figure 2A:
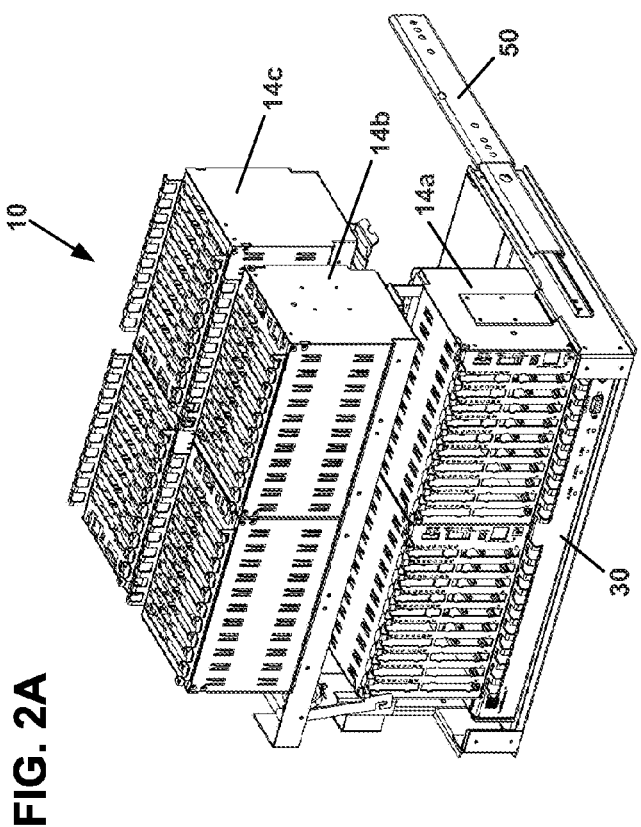
FIG. 2A illustrates the slide guides of the drawer of FIG. 2 in an extended position, the drawer shown without the mounting brackets or the upright rails.
Figure 6A:
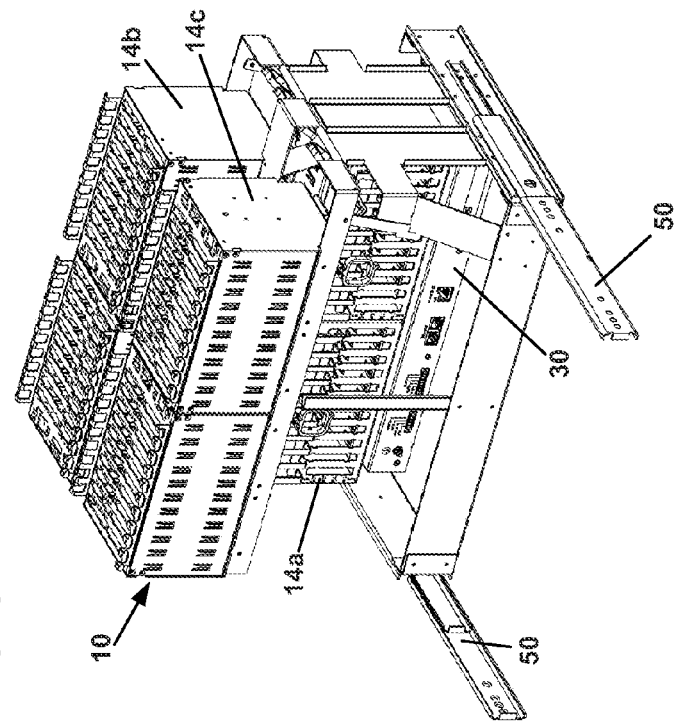
FIG. 6A illustrates the slide guides of the drawer of FIG. 6 in an extended position, the drawer shown without the mounting brackets.

The front to back slidability of the drawer 10 is provided by telescoping slide guides 50 of the drawer 10 that are fastened to the mounting brackets 40 used for mounting the drawer 10 to the uprights 12. The slide guides 50 telescope to allow the drawer 10 to be pulled away from and pushed back toward the uprights 12. Please note that the slide guides of the drawer are shown in a non-telescoped position in FIGS. 2-4, 10, and 19 for the purpose of illustrating the fastener holes 51 on the outer slide guide for attachment to the fastener holes 53 of the mounting brackets 12. A telescoped configuration of the slide guides 50 can be seen in FIGS. 2A and 6A. Such slide guide configurations are known in the art. Other configurations or types of structures are possible for providing slidability of the drawer 10.

As shown in FIGS. 3-4 and discussed previously, once the drawer 10 is slidably pulled out, the upper platform 26 of the drawer 10 can be pivoted away from the lower platform 24 to gain access to hard-to-reach areas of the telecommunications equipment mounted on the drawer. FIG. 3 illustrates a partially pivoted position of the drawer 10 and FIG. 4 illustrates the drawer 10 in a fully pivoted position.

FIGS. 5-10 illustrate the drawer 10 and the mounting brackets 40 in isolation, removed from the uprights 12 of the rack and FIG. 11 illustrates the drawer 10 without the mounting brackets 40.

Figure 14:
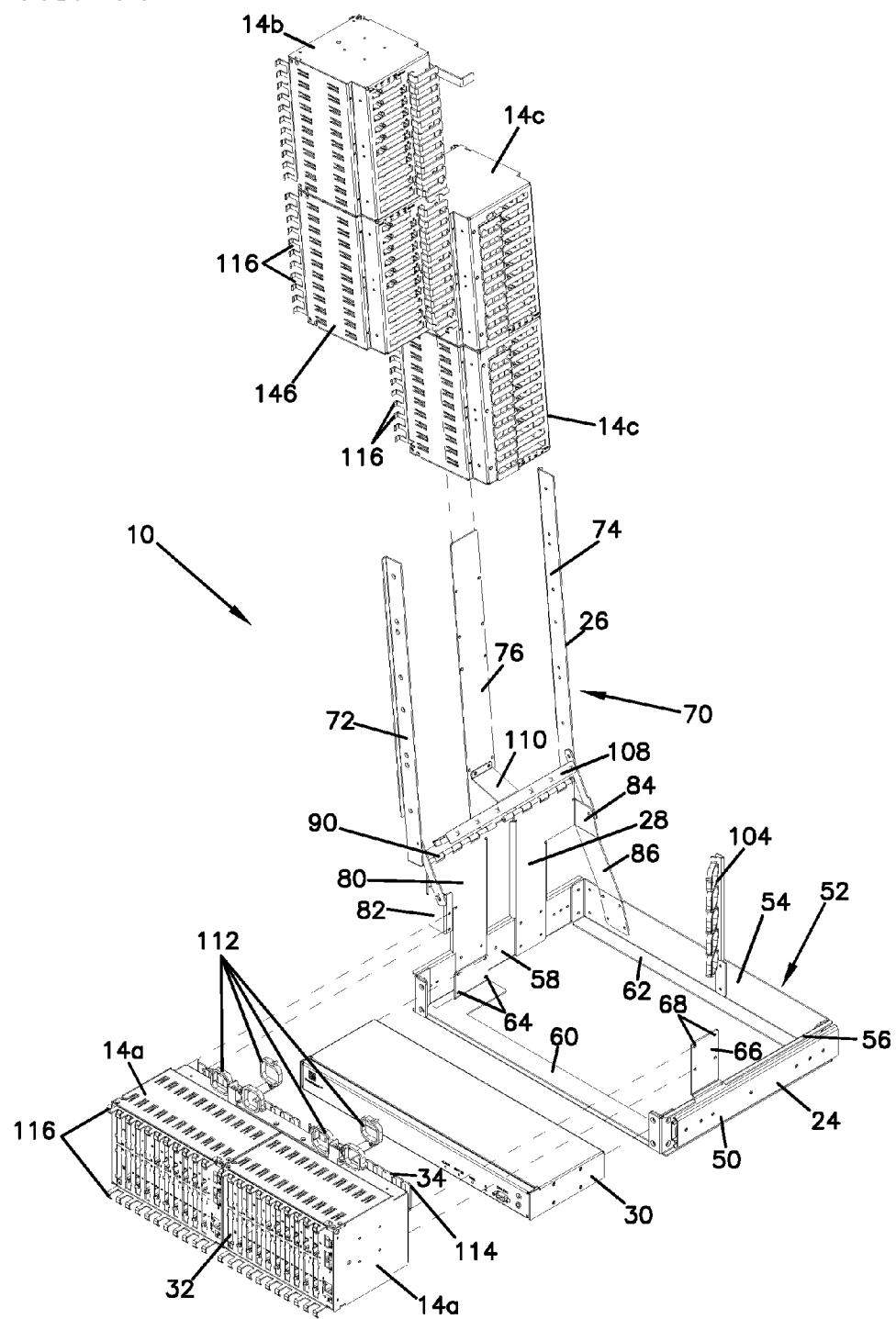
FIG. 14 illustrates an exploded perspective view of the drawer of FIG. 10 without the mounting brackets, wherein the telecommunication distribution blocks and a controller associated with the blocks are shown exploded off the drawer.
Figure 15:
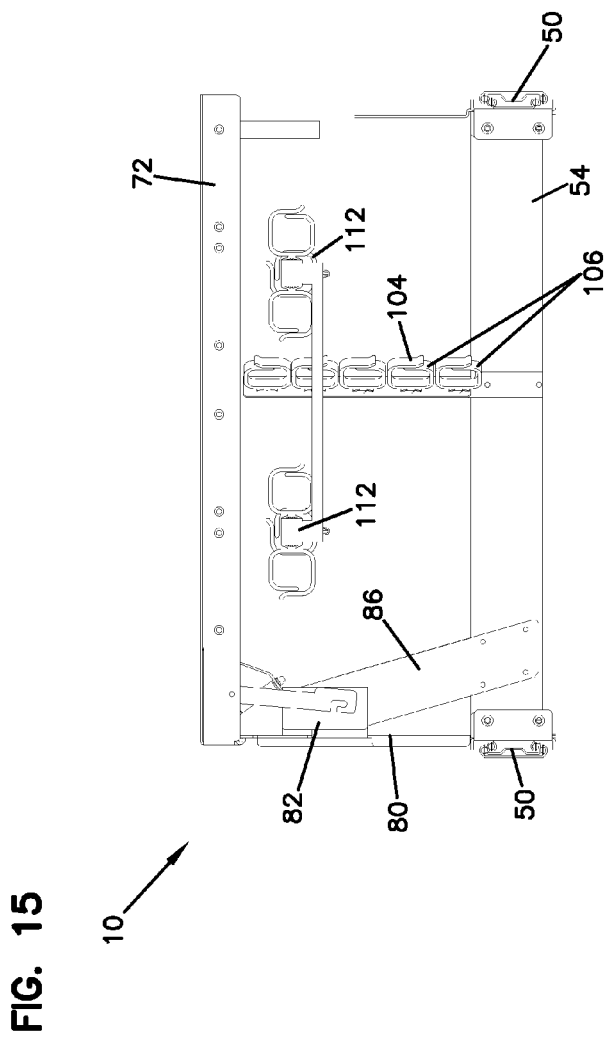
FIG. 15 illustrates a front elevational view of the telecommunications drawer of FIG. 14, wherein the drawer is shown without the telecommunication distribution blocks and the controller.
Figure 16:
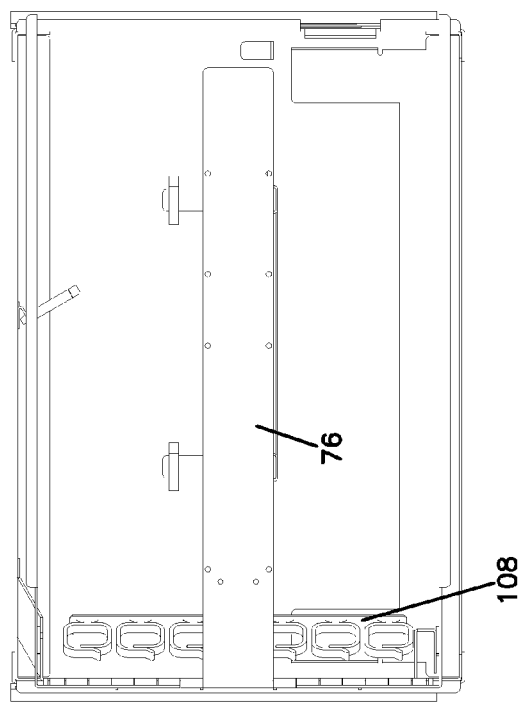
FIG. 16 illustrates a top plan view of the empty telecommunications drawer of FIG. 15.
Figure 17:
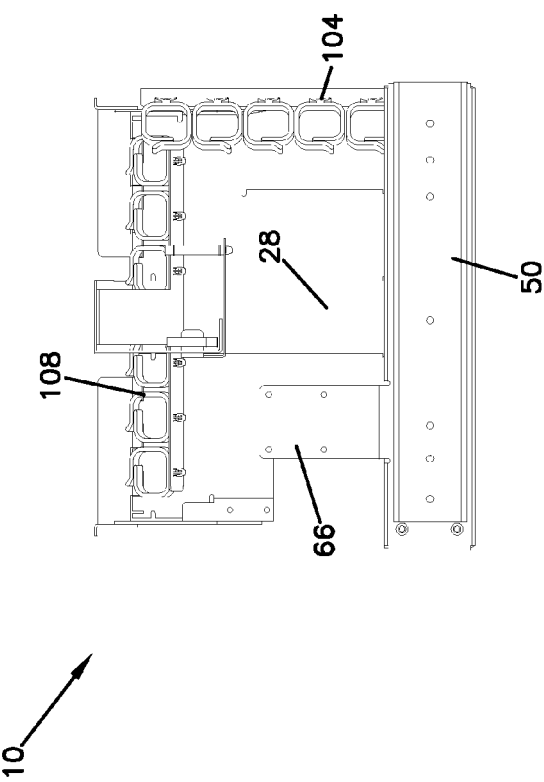
FIG. 17 illustrates a right side elevational view of the empty telecommunications drawer of FIG. 15.
Figure 18:
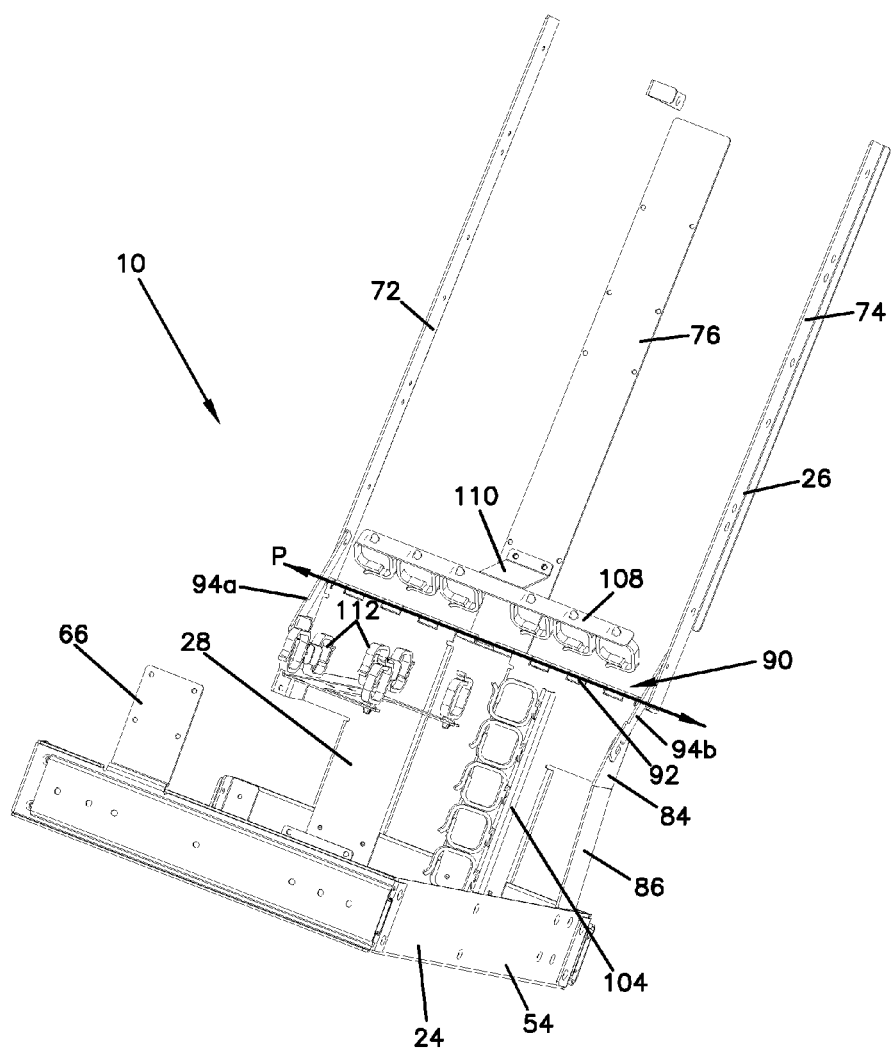
FIG. 18 illustrates the empty telecommunications drawer of FIG. 15, wherein the upper platform has been fully pivoted with respect to the lower platform of the drawer.

FIG. 14 illustrates an exploded view of the drawer 10, wherein the telecommunication distribution blocks 14 and the controller 30 are removed from the drawer 10. The structural details of the upper and lower platforms 26, 24 of the drawer 10 can be viewed in greater detail in FIG. 14.

Still referring to FIG. 14, the lower platform 24 of the telecommunications drawer 10 includes a lower frame 52. The lower frame 52 includes a lower platform rear wall 54, a lower platform right sidewall 56, a lower platform left sidewall 58, a lower platform front base plate 60, and a lower platform rear base plate 62. The right and the left sidewalls 56, 58 include fastener holes 64 for mounting the controller unit 30. The right sidewall 56 also includes an upwardly extending plate 66 with fastener holes 68 for mounting the telecommunication distribution blocks 14a to the lower platform 24.

The upper platform 26 of the telecommunications drawer 10 includes an upper frame 70. The upper frame 70 includes an upper platform front mounting plate 72, an upper platform rear mounting plate 74 and an upper platform middle base plate 76. The plates 72, 74, and 76 of the upper frame 70 include fastener holes 78 for mounting the telecommunication distribution blocks 14b, 14c to the upper platform.

The upper platform 26 is connected to the lower platform 24 via the vertical extension 28 adjacent the left side 22 of the drawer 10. The vertical extension 28 includes a vertical extension sidewall 80 that has front and rear bent flanges 82, 84. The vertical extension 28 also includes an angled reinforcement plate 86 extending from the rear bent flange 84 to the lower platform rear wall 54.

An upper end 88 of the vertical extension 28 includes a pivot assembly 90 for pivotally mounting the upper platform 26 with respect to the lower platform 24. The pivot assembly 90 includes a hinge 92 extending from the front 16 to the rear 18 of the drawer 10. The pivot hinge 92 defines a pivot axis P that extends in a direction generally going from the front end 16 to the rear end 18 of the drawer 10. The pivot assembly 90 also includes front and rear linkage arms 94a, 94b that extend from the upper platform mounting plates 72, 74 to the front and rear bent flanges 82, 84, respectively.

Figure 13:
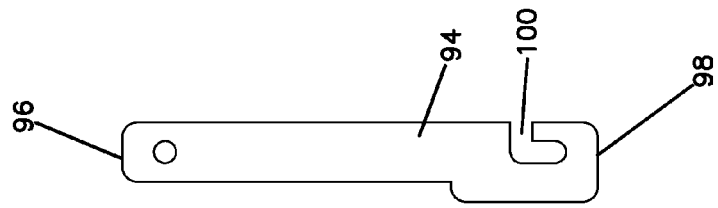
FIG. 13 is a side view of the pivot linkage arm of FIG. 12, shown separate from the drawer.
Figure 12:
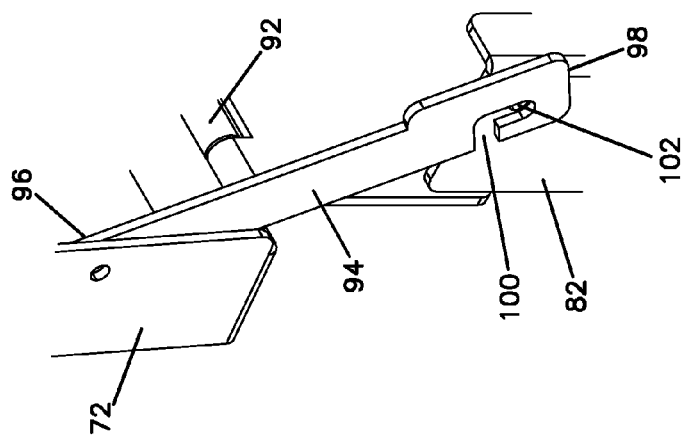
FIG. 12 is a close-up view of one of the pivot linkage arms of the drawer of FIG. 10.

In FIGS. 12-13, a close up of one of the linkage arms 94 is illustrated. The upper ends 96 of the linkage arms 94 are pivotally fastened to the upper platform front and rear mounting plates 72, 74. The lower ends 98 of the linkage arms 94 include an L-shaped cutout 100 that pivots about a pin 102 located on the front and rear bent flanges 82, 84. The linkage arms 94 are configured to stop pivoting of the upper platform 26 after the platform 26 has reached a fully pivoted position, as seen in FIG. 4. In certain embodiments, a locking or a biasing mechanism can also be used on the drawer 10 to hold the upper platform 26 in an open position and to prevent the upper platform 10 from falling down after it has been pivoted up.

Now referring to FIGS. 11 and 15-18, the cable management features of the drawer 10 are illustrated in detail. FIGS. 15-18 illustrate the drawer 10 in an "empty" configuration wherein the telecommunication distribution blocks 14, the controller 30, and the mounting brackets 40 have been removed. Please note that the cable management structures that are normally mounted on the top sides of the lower blocks 14a are still shown in FIGS. 15-18, however, in an exploded view.

As discussed previously, the cable management structures located on the drawer 10 and on the blocks 14 are generally configured to route all cable away from the rear end 18 of the drawer 10.

The drawer 10 includes a first cable management structure 104 fastened to the lower platform rear wall 54. The first cable management structure 104 is an upright structure including a plurality of loops 106. The first cable management structure 104 is oriented at an angle such that it routes cables coming from the rear 18 of the drawer 10 toward both lower blocks 14a and toward the hinge 92.

A second cable management structure 108 that has a similar structure to the first cable management structure 104 is located adjacent the hinge 92. The second cable management structure 108 is fastened to the upper platform middle base plate 76 via a plate 110. The second cable management structure 108 extends horizontally from the front end 16 of the drawer 10 to the rear end 18 of the drawer 10. The second cable management structure 108 is designed to route cable coming from the lower platform 24 to the bottom sides 38 of the upper blocks 14b, 14c.

The lower telecommunication distribution blocks 14a also include cable management structures mounted thereon. A pair of third cable management structures 112 are fastened to the top side of the lower blocks 14a, (See FIG. 11). The third cable management structures 112 also include loops and are designed to fan-out the cable extending from the rear 34 of the lowers block 14a to the front 32 of the lower blocks 14a, as the cable extends over the top side of the blocks 14a.

As illustrated in the FIG. 11, both the lower blocks 14a and the upper blocks 14b, 14c include additional cable management structures mounted thereon. The blocks 14 include fingers 114 located at the rear 34 of the lower blocks 14a (at the bottom side 38 of the upper blocks 14b, 14c). The blocks 14 also include upper and lower tabs 116 in the front 32 of the lower blocks 14a (upper and lower tabs 116 being oriented from front to rear on the upper blocks 14b, 14c).

The cable management structures are positioned such that generally all of the cabling going toward the blocks 14b, 14c in the upper platform 26 are routed toward the left side 22 of the drawer 10, where the hinge 92 is located. In this manner, the amount of slack cable needed can be reduced in allowing for the pivotability of the upper platform 26.

Since the cable is generally routed away from the drawer 10 from the rear end 18 of the drawer 10 and since the drawer 10 is configured to be slid forwardly, excess cable may be needed adjacent the rear end 18 of the drawer 10 to provide for sufficient slack. As illustrated in FIG. 11, the drawer 10 defines a space 120 for storing slack cable behind the lower blocks 14a, underneath the upper rear blocks 14c. This space 120 serves to store a large amount of slack cable that is routed from the rear 18 of the drawer 10 and that is needed to provide for the forward slidability of the drawer 10.

Figure 19:
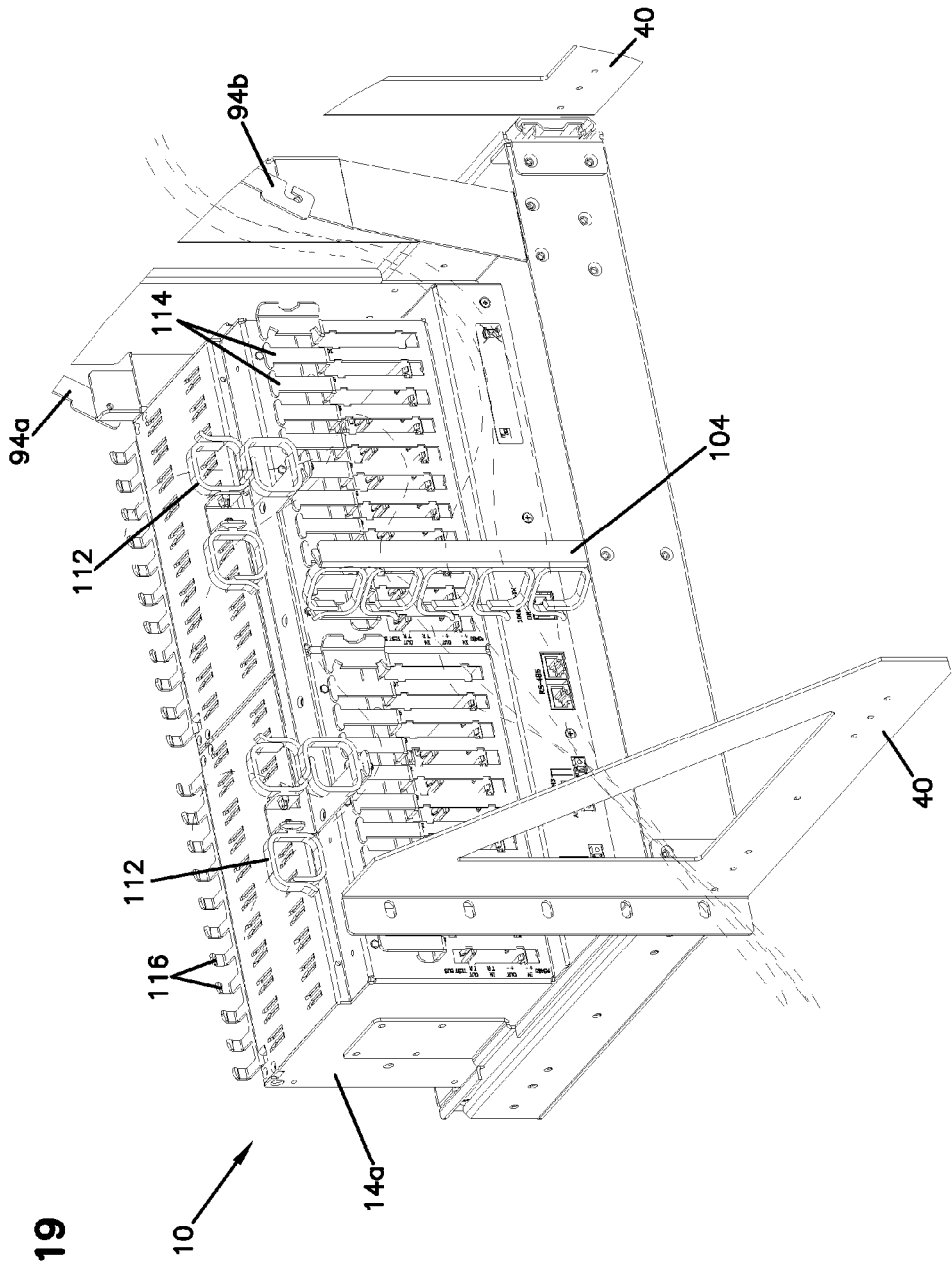
FIG. 19 illustrates the cable routing configuration for the telecommunication distribution block mounted on the lower platform of the drawer of FIG. 10.
Figure 20:
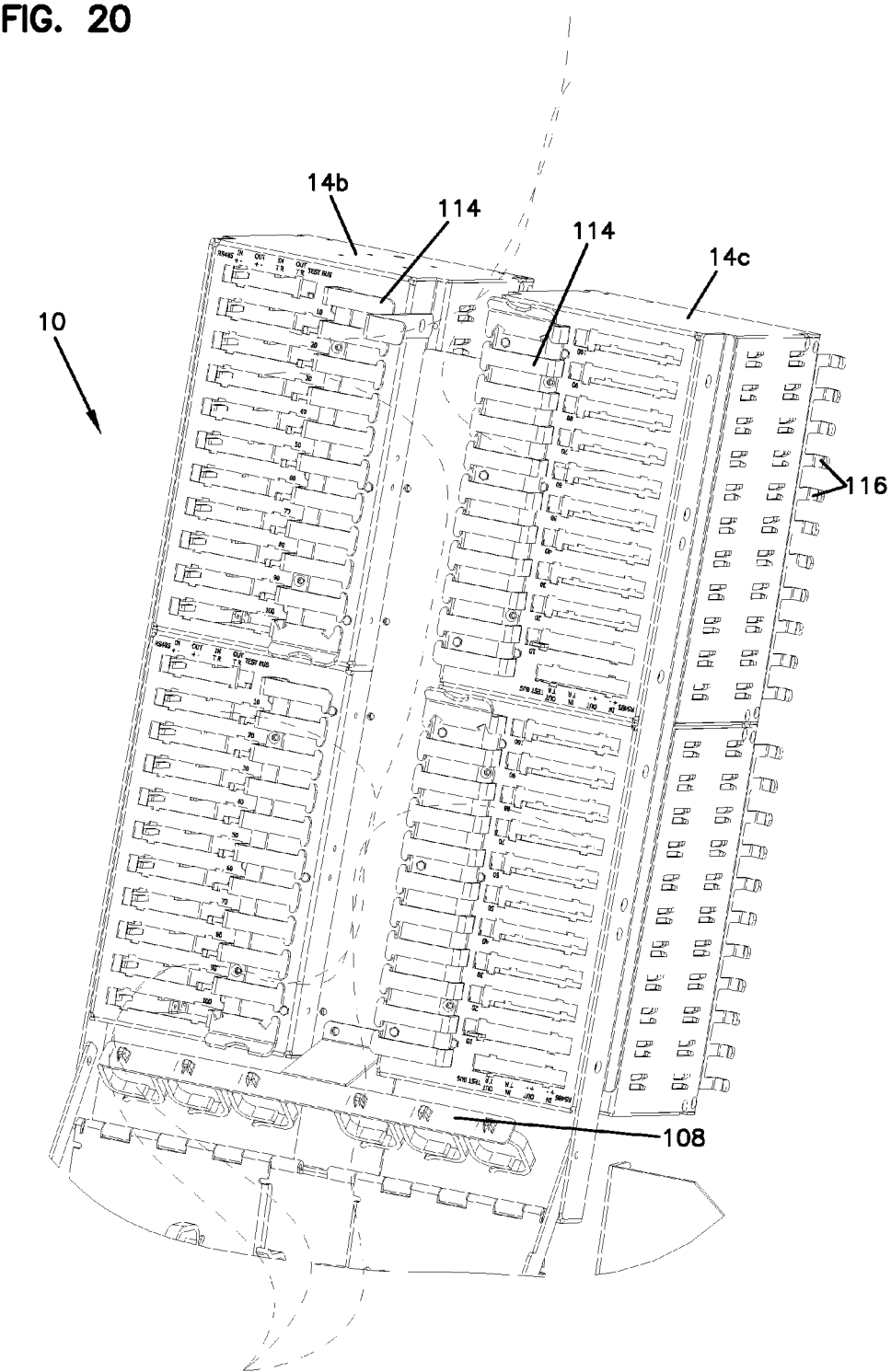
FIG. 20 illustrates the cable routing configuration for the telecommunication distribution blocks mounted on the upper platform of the drawer of FIG. 10.

FIGS. 19-20 illustrate the routing of the cables going the upper 14a and lower blocks 14b, 14c to the rear 18 of the drawer 10 and away from the drawer 10.

It should be noted that, although in the foregoing description of the telecommunications drawer 10, terms such as "front", "back", "right", "left", "top", and "bottom" have been used for ease of description and illustration, no restriction is intended by such use of the terms.

The embodiments discussed above are provided as examples. Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A telecommunications device comprising:
   a drawer configured to be slidably mounted on a telecommunications rack such that the drawer can slide away from and toward the rack, the drawer defining a front end, a rear end, a right side, and a left side, the drawer including flanges on the right and left sides for mounting the drawer to the telecommunications rack, the drawer including a lower platform and an upper platform, the upper platform pivotally coupled to the lower platform via a hinge, the hinge defining an axis extending in the direction from the front end toward the rear end of the drawer;
   a first set of telecommunications blocks mounted on the lower platform, each block of the first set of telecommunications blocks defining a front end and a rear end and including connectors at the front end and at the rear end of the block; and
   a second set of telecommunications blocks mounted on the upper platform directly above the first set of telecommunications blocks, each block of the second set of telecommunications blocks defining a top side and a bottom side and including connectors at the top side and at the bottom side of the block, wherein the upper platform is configured to pivot away from the lower platform to gain access to the connectors located at the bottom side of the second set of telecommunications blocks.

2. A telecommunications device according to claim 1, wherein, when the drawer is mounted on a telecommunications rack, the upper platform is configured to pivot away from the lower platform only when the drawer has been slid away from the telecommunications rack.

3. A telecommunications device according to claim 1, wherein the upper and the lower platforms are coupled in a spaced-apart relationship via a vertical extension, wherein the vertical extension includes an upper end and a lower end, the lower end of the vertical extension coupled to the lower platform and the upper end of the vertical extension coupled to the upper platform, wherein the vertical extension includes the hinge at the upper end for pivotally coupling the upper platform to the vertical extension.

4. A telecommunications device according to claim 1, wherein the drawer includes a first cable management structure adjacent the rear end of the drawer and a second cable management structure adjacent the hinge.

5. A telecommunications device according to claim 1, wherein the upper platform and the lower platform include cable management structures in the form of loops.

6. A telecommunications device according to claim 1, wherein the drawer is configured to be mounted on a telecommunications rack having a width of about 19 inches.

7. A telecommunications device according to claim 1, wherein the drawer is configured to be mounted on a telecommunications rack having a width of about 23 inches.

8. A telecommunications device according to claim 1, wherein the drawer has a width of approximately 515 mm.

9. A telecommunications device according to claim 8, wherein the drawer has a total height of about 400 mm including the first and second sets of telecommunications blocks mounted thereon.

* * * * *